Oct. 20, 1959  G. D. ARCHARD  2,909,688
MAGNETIC MEANS FOR DEFLECTING ELECTRON BEAMS
Filed Feb. 17, 1958  3 Sheets-Sheet 1

INVENTOR
GEOFFREY DENNIS ARCHARD
ATTORNEY

INVENTOR
GEOFFREY DENNIS ARCHARD
ATTORNEY

2,909,688

MAGNETIC MEANS FOR DEFLECTING ELECTRON BEAMS

Geoffrey Dennis Archard, Caversham, Reading, England, assignor to Metropolitan-Vickers Electrical Company Limited, London, England, a British company Application February 17, 1958, Serial No. 715,727

Claims priority, application Great Britain February 19, 1957

4 Claims. (Cl. 313—76)

This invention relates to the deflection of electron beams. It has particular application in cathode ray tubes and electron microscopes.

When an electron travelling at uniform velocity in a straight line passes into a region of uniform magnetic field perpendicular to its original direction of motion, the path of the electron is deformed into a circular arc in the same plane as its original direction of motion, and when the electron leaves the region of magnetic field it resumes rectilinear propagation in the same plane as its path in the region of magnetic field. In practice, it is impossible to produce a sharply terminating region of magnetic field, and therefore, in general, in any practical approximation to the situation described, the electron will pass through transitory regions in which there exists a small component of magnetic field, which is not in the same plane as the direction of motion of the electron and the main component of magnetic field, and which therefore slightly deflects the electron in a sense parallel or antiparallel to the main component of magnetic field.

When a beam of electrons travelling at uniform velocity passes through a region of magnetic field of the kind described, all the electrons will be deflected through substantially the same angle in a plane perpendicular to the main component of magnetic field, while at the same time undergoing different small deflections parallel to the direction of the main component of magnetic field, and this may produce a focussing action in the latter direction. This focussing action is undesirable in many applications, such as cathode ray tubes and electron microscopes, because it spreads out an electron beam originally of circular cross-section and gives it an elliptical cross-section of extended form.

It is well known that when only small angles of deflection are in question, the focussing action can be largely eliminated by means of current-carrying coils having an empirically determined shape. For large angles of deflection (of the order of 50° to 80°) this method is not found satisfactory.

It is an object of the present invention to provide an arrangement for deflecting electron beams through large angles which at the same time does not distort or focus the beam in the manner described.

According to the present invention an arrangement for deflecting an electron beam comprises a pair of magnetic polepieces each shaped so as to be symmetrical about a common axis and in which the direction of the electron beam is perpendicular to said axis and is arranged to be along a line extending radially of said common axis through regions of non-uniform magnetic field (e.g. the fringing field) so that in each such region the beam direction lies in a plane containing the magnetic lines of force of the field, whereby the beam undergoes deflection without distortion or focussing due to the nonuniform field in such regions.

Preferably the magnetic pole pieces are formed of a pair of similar sized co-axial cylindrical members.

In some applications, particularly electron microscopes, there is a requirement for producing an electron beam which is at a predetermined angle to a given axis. This can be achieved by successively deflecting the electron beam in two opposite directions.

In accordance therefore with a further aspect of the invention an arrangement for deflecting an electron beam comprises two pairs of pole-pieces arranged to apply opposite magnetic fields to deflect in respective opposite directions in a single plane an electron beam passing in succession between them, and in which pole-pieces are so shaped that the cross-sections of successive pole-pieces in a plane parallel to the plane of the electron beam have the edges facing each other symmetrical about a common axis extending perpendicular to said plane, which axis is positioned so that the direction of the electron beam through regions of non-uniform magnetic field (e.g. the fringing field) is along a line extending radially of said common axis, whereby the beam undergoes deflection without distortion or focussing due to the non-uniform field in such regions.

In order that the invention may be more fully understood reference will now be made to the accompanying drawings, in which:

Figs. 1a and 1b show one embodiment of the invention in elevation and plan respectively; while

Figure 1A:
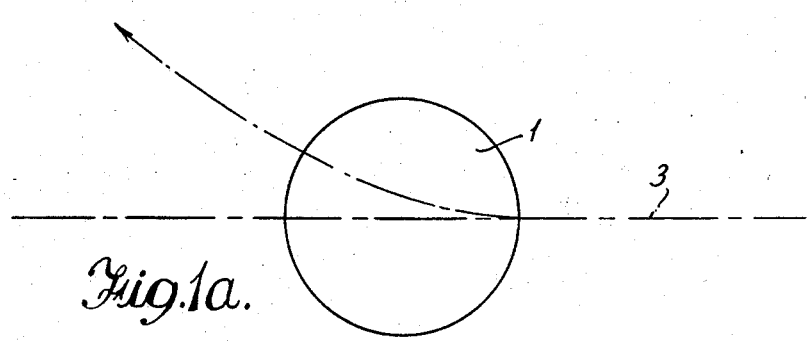
Figure 1B:
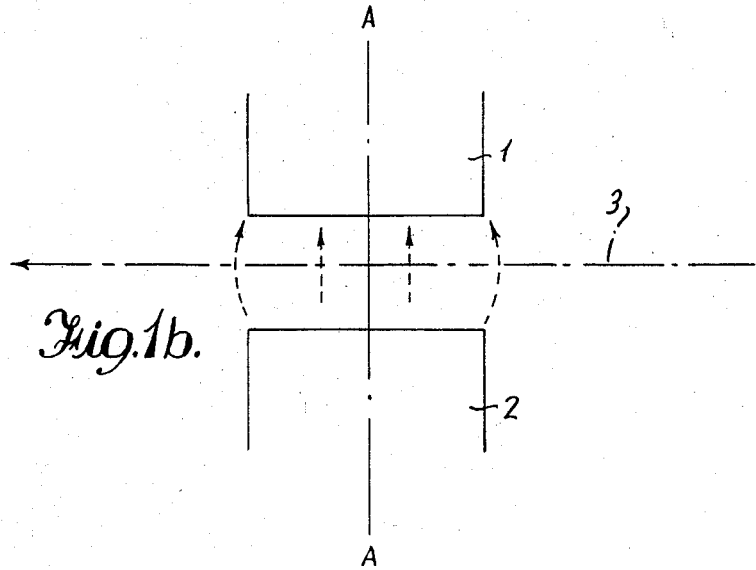

Referring to Figs. 1a and 1b a pair of magnetic pole-pieces 1 and 2 are formed of a pair of similar sized co-axial cylindrical members having a common axis AA.

Between the two pole-pieces there will be a magnetic field, the main component of which is parallel to the axes of the pole-pieces. Towards the edges of the pole-pieces, the magnetic lines of force curve outwards as depicted, but by symmetry, they remain always in planes containing the axes of the pole-pieces. If therefore an electron beam 3 is directed from a point well away from the pole-pieces perpendicularly towards their common axis, it will be deflected only by the component of magnetic field parallel to the said common axis, and will describe substantially a circular arc during the period in which it moves between the pole-pieces. The electrons will thus emerge from between the pole-pieces travelling in a plane which also contains the common axis of the pole-pieces, and will thus experience no force tending to make it move parallel or antiparallel to the direction of the said common axis. A beam of electrons of lateral dimensions small compared with the radius of the cross-section of the pole-pieces, directed substantially towards the common axis of the pole-pieces at right-angles will thus undergo deflection in the plane at right-angles to the said common axis, but will not suffer appreciable focussing of the kind described.

Figure 2A:
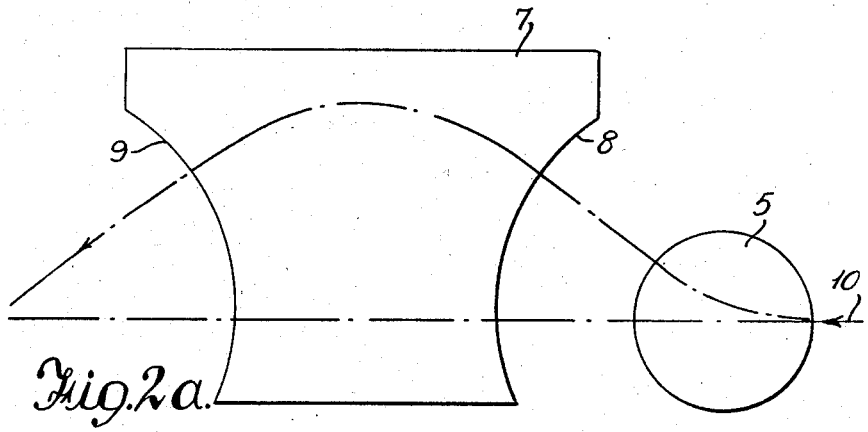
Figs. 2a and 2b show an embodiment which deflects a beam in two opposite directions in elevation and plan respectively.
Figure 2B:
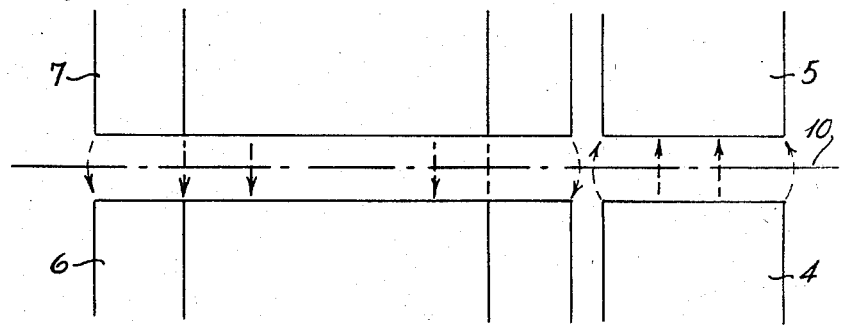

Referring now to Figs. 2a and 2b there is shown therein two pairs of pole pieces, one pair comprising pole-pieces 4 and 5 and the other pair pole-pieces 6 and 7. Pole-pieces 4 and 5 are cylindrical and are similar to those shown in Figs. 1a and 1b. Pole-pieces 6 and 7 however have cross sections as shown in Fig. 2a which include concave cylindrical surfaces 8 and 9. Surface 8 is arranged to be concentric with the convex cylindrical surface of pole-pieces 4 and 5. The two pairs of pole-pieces are arranged to produce magnetic fields extending in respective opposite directions so that an electron beam passing between them is deflected in two opposite directions consecutively. As shown in the figures an electron beam 10 is directed towards the common axis of pole-pieces 4 and 5 and thus is deflected so as to enter the region of fringing field between pole-pieces 6 and 7 in substantially the same plane as the lines of magnetic force existing in that region and hence the beam will undergo deflection without focussing. Since surface 9 of pole-pieces 6 and 7 is also a concave cylinder described about an axis collinear with the original direction of beam 10 the beam will emerge from the region between these pole-pieces substantially in a plane containing the common axis of said further surfaces and thus will remain undistorted. Clearly this procedure may be continued through regions between any number of pairs of pole-pieces having parallel axes and an electron beam can undergo successive deviations substantially in a plane at right angles to these axes without being focussed in the manner described.

The arrangement described in Figs. 2a and 2b has important application in electron microscopes where a beam of electrons from a fixed source is required to undergo deflection twice in such a way that the electrons will strike the line forming the continuation of their original direction of motion at any specified angle between 0° and 20° without the shape or size of the cross-section of the beam being appreciably distorted. The angle in question could be controlled by suitably varying the magnitudes of the deflecting magnetic fields.

Figure 3:
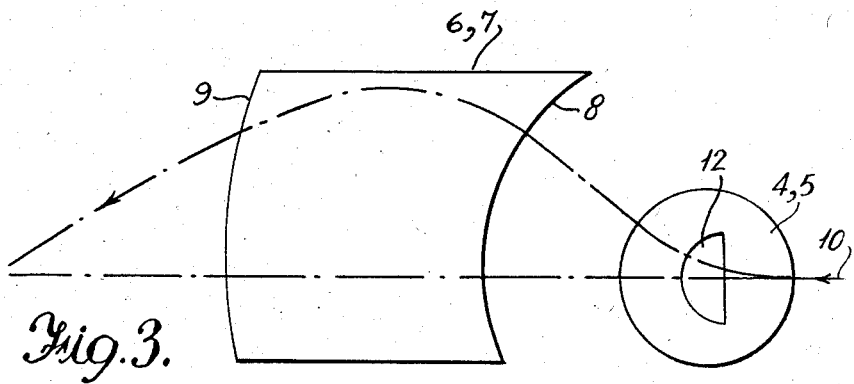
Fig. 3 shows a modification of the embodiment of Fig. 2.

The arrangements which have been described prevent focussing in planes parallel to the lines of force of the deflecting field, but at the same time introduce a certain amount of focussing in the plane of deflection. This can easily be seen by reference to Fig. 1. If an electron enters the deflector on a track parallel to the line 3, but slightly above it in the plane of the diagram, its path in the deflecting field will be slightly shorter than that of an electron entering along the line 3. It will therefore be deflected less than the latter and the paths of the two electrons will converge towards one another. This may be prevented as shown in Fig. 3, by cutting a semicircular section 12 out of each polepiece. The radius of the semicircle is half that of the polepiece cross section, and the section is arranged with its flat face towards the incident electron in such a way that the centre of the gap lies approximately at the centre of the polepiece cross section. This system deflects electrons substantially without focussing in any plane.

For applications to electron microscopy, it is necessary to extend a similar principle to the second pair of deflectors (6, 7 in Figure 2). This may be done by reversing the curvature on the exit face 9, as shown in Fig. 3. Focussing in the plane of deflection still exists, but it is equalled by focussing perpendicular to the plane of deflection brought about by the fact that the electrons now emerge from face 9 obliquely to the fringing component of the deflecting field. The whole system will thus act as the combination of a deflector and a spherical lens, but the presence of the latter is immaterial as it does not introduce astigmatism. It may still be necessary to make slight adjustments to the exact shapes of the faces in order to achieve complete correction.

Figure 4A:
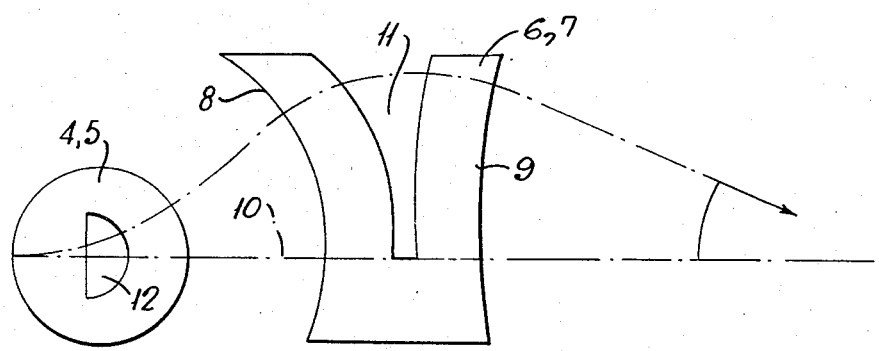
Figs. 4a and 4b show yet another modification of the embodiment of Fig. 2 in elevation and side elevation.
Figure 4B:
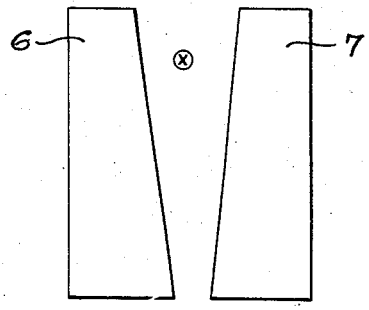

Referring now to Figs. 4a and 4b yet another embodiment of the invention is shown therein. In these Figures pole-pieces 4 and 5 are similar to the like numbered pole-pieces in Fig. 3 and are arranged to be cylindrical in shape with semi-circular sections 12 cut out from them. Pole-pieces 6 and 7, however, are arranged to have their entry faces 8 and their exit faces 9 curving in opposite directions. The centre of curvature of face 8 is arranged to lie on the axis of cylinders 4 and 5, while the centre of curvature of face 9 lies some distance along the line 10 which is in the line of the original direction of the electron beam. Gaps 11 are provided in pole-pieces 6 and 7 and these gaps are arranged to diverge in a direction away from line 10. The curves bounding surface of gap 11 need not have a critical radius.

A further feature of the pole-pieces of Fig. 4a is that the gap between them increases in a direction away from the centre line 10 as shown in the side elevation of Fig. 4b. If the minimum width of the gap between pole-pieces 6 and 7 along centre line 10 is B then the taper is arranged to be such that this gap increases to a maximum of one-and-a-half to two times the value of B.

To give some idea of the relative dimension and curvature of the various surfaces let the radius of pole-pieces 4 and 5 be R, then the radius of semi-circular portion 12 is $$\frac{R}{2}$$

and the radius of entry surface 8 of pole-pieces 6 and 7 is $(5/3)R$. The arc defining surface 8 is described about the centre of pole-pieces 4 and 5. These dimensions also apply to the arrangement of Fig. 3. In Fig. 4b the radius of exit surface 9 of pole-pieces 6 and 7 is about 5R.

What I claim is:

1. An arrangement for deflecting an electron beam comprising a pair of magnetic pole-pieces defining a gap between them, and means for directing an electron beam along a path between said gap, the cross sections of said pole-pieces in planes parallel to the path of the electron beam at the entry of said beam path to said gap and exit of said beam path from said gap being bounded by arcs of circles the centers of which lie on lines co-linear with the paths of the electron beam at entry and exit respectively.

2. An arrangement for deflecting an electron beam comprising a pair of magnetic pole-pieces having circular faces and defining a gap of cylindrical shape between them, and means for directing an electron beam into said gap perpendicularly to, and radially of, the axis of said cylinder.

3. An arrangement for deflecting an electron beam comprising two pairs of pole-pieces, each pair defining a gap between the pole-pieces of the pair, means for applying magnetic fields between the gaps in respective opposite directions, means for directing an electron beam to pass in succession between said gaps and be deflected by the magnetic fields in said gaps in respective opposite directions in a single plane, the cross sections of said pairs of pole-pieces in planes parallel to the path of the electron beam at the points of entry and exit of the electron beam path to and from said gaps being bounded by arcs of circles the centers of which lie on lines co-linear with the paths of the electron beam at said respective points.

4. An arrangement for deflecting an electron beam comprising a pair of magnetic pole-pieces defining a gap between them, and means for directing an electron beam along a path between said gap, the cross sections of said pole-pieces at the entry of said beam path to said gap and exit of said beam path from said gap being bounded by arcs of circles the centers of which lie on lines co-linear with the paths of the electron beam at entry and exit respectively, and the faces of the pole-pieces having cutaway portions tapering inwardly in a direction radially inwardly of the curve of the electron beam in the gap so that the path lengths of each part of the beam through the magnetic field in the gap are equal.

References Cited in the file of this patent

UNITED STATES PATENTS

| | | |
|---|---|---|
| 2,152,363 | Ruska | Mar. 28, 1939 |
| 2,319,811 | George | May 25, 1943 |
| 2,777,958 | Le Poole | Jan. 15, 1957 |